(No Model.)

F. CROCKER.
PIPE COUPLING FOR GAS MAINS.

No. 344,723. Patented June 29, 1886.

WITNESSES:
Snowden Bell.
C. M. Clarke.

INVENTOR,
Frederick Crocker,
by George H. Christy Att'y.

UNITED STATES PATENT OFFICE.

FREDERICK CROCKER, OF OLEAN, NEW YORK, ASSIGNOR OF ONE-HALF TO CHARLES D. ROBBINS, OF BURGETTSTOWN, PENNSYLVANIA.

PIPE-COUPLING FOR GAS-MAINS.

SPECIFICATION forming part of Letters Patent No. 344,723, dated June 29, 1886.

Application filed January 28, 1886. Serial No. 190,037. (No model.)

*To all whom it may concern:*

Be it known that I, FREDERICK CROCKER, residing at Olean, in the county of Cattaraugus and State of New York, a citizen of the United States, have invented or discovered a certain new and useful Improvment in Pipe-Couplings for Gas-Mains, of which improvement the following is a specification.

Figure 1:
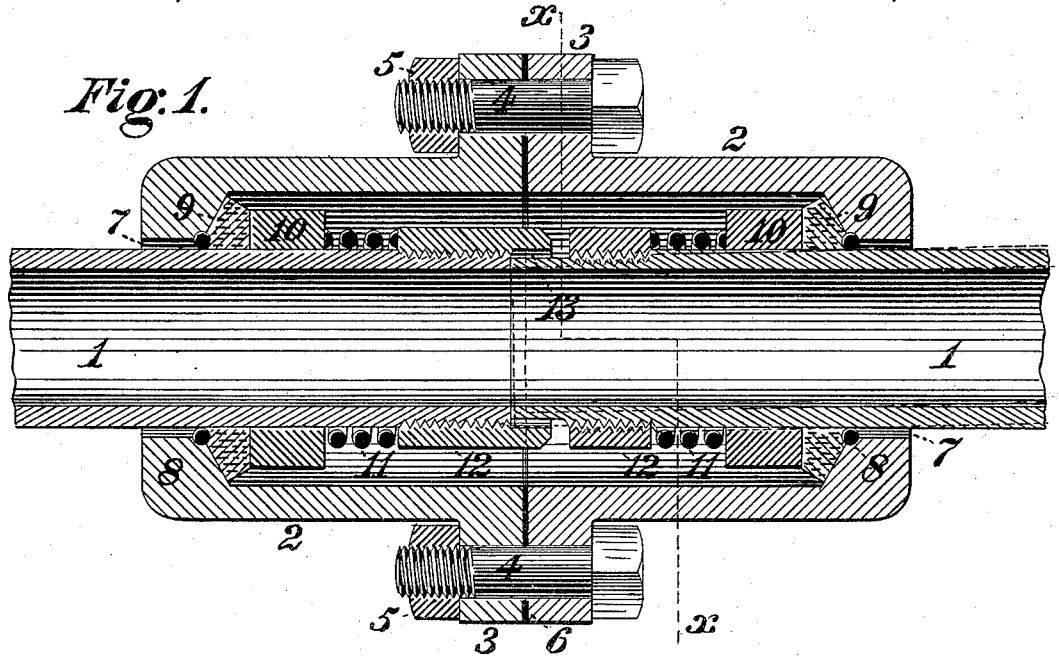
Figure 2:
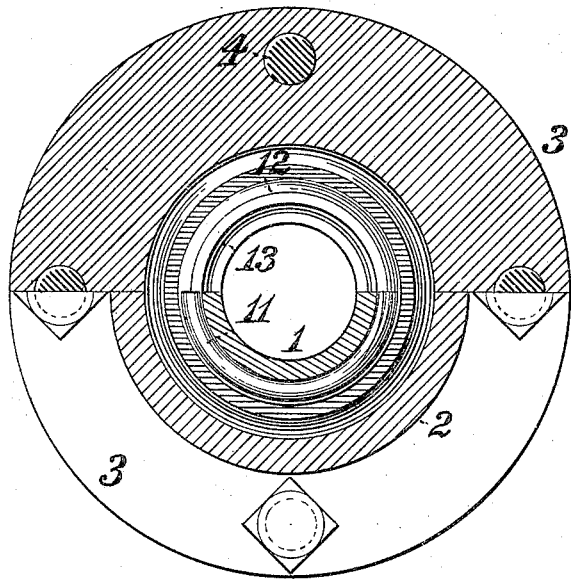

In the accompanying drawings, which make part of this specification, Figure 1 is a longitudinal central section through a pipe-coupling embodying my invention, and Fig. 2 a transverse section through the same at the line *x x* of Fig. 1.

The object of my invention is to provide a coupling for connecting the several sections of pipes or mains for the conveyance of gas or other fluids, in the use of which leakage of fluid at the joints of the mains may be effectively prevented, and variations of level and expansion and contraction of the line suitably provided for.

To this end my invention, generally stated, consists in the combination, with a sectional or divided case or box fitting freely around the adjacent ends of two pipe-sections, of packing rings or gaskets closing the end joints between the case and pipe-sections and springs bearing against collars on the pipe-sections and exerting outward tension on the packing-rings.

The improvement claimed is hereinafter fully set forth.

In the practice of my invention the adjacent ends of the sections 1 1 of the main or pipe line which are to be coupled are adapted to abut one against the other, or to stand at a short distance apart, and are inclosed within a sectional or divided case or box, 2, formed of two sections, having flanges 3, on their abutting faces, which are accurately trued off, so as to make a tight joint when fitted together, and held closely in contact by bolts 4, provided with proper nuts, 5. A packing-ring, 6, of lead, rubber, or other suitable yielding material may, if desired, be interposed between the meeting faces of the sections of the case, which is preferably divided transversely, as shown, although, if desired, the division may be longitudinal. The end openings, 7, through which the pipe-sections 1 1 pass into the case 2, are made of sufficiently larger diameter than the sections, to admit of movement of the latter relatively to the axis of the case, so that the sections may either extend in line therewith or be inclined at a greater or less angle thereto, in correspondence with variations of level in the line, as indicated in dotted lines in Fig. 1. Rings 8, of metal, of circular or elliptical transverse section, fitting in the case 2, at the inner ends of the openings 7, serve as bearings, within which the pipe-sections have the capacity of free movement relatively to the case. The inner surfaces of the ends of the case are tapered or inclined toward the central openings, 7, therein, and tight joints are made between the pipe-sections and the ends of the case by packing rings or gaskets 9, of rubber, soft metal, or other material adapted to prevent the leakage of fluid, by being compressed against the surfaces between which such leakage tends to take place, said rings being slipped over the ends of the pipe-sections and abutting against the bearing-rings 8 and the tapered inner ends of the case. Loose collars or followers 10, of metal, are fitted freely around the pipe-sections, adjacent to the inner sides of the packing-rings 9, in order to serve as movable abutments or bearing-plates for transmitting to said rings the tension of helical springs 11, one of which encircles each pipe-section between its loose collar 10 and a fixed collar or abutment, 12, which is screwed upon or otherwise firmly secured to the section adjacent to its end. A cylindrical recess, 13, the bore of which corresponds substantially with that of the end openings, 7, of the case, is formed in the end of one of the pipe-sections, said recess receiving the end of the opposite section, which projects beyond its fixed ring 12, and serving, in connection with the openings 7, to limit, as desired, the degree of variation of the pipe-sections from the axial line of the case.

It will be seen that under the above construction the tension of the springs acts constantly to compress and maintain the packing-rings 9 closely in contact with the pipe-sections and the ends of the case, such tension being supplemented by the pressure of the fluid which passes into the case, acting on the backs of the loose rings or followers 10 of the packing-rings. The pipe-sections being free to move within the end openings, 7, of the case without impairing the tightness of the joints, a flexible coupling, admitting of difference of level in the line, either normal or accidental, as the case may be, is thus provided, and free expansion and contraction of the pipe-sections is also admitted of without inducing leakage therefrom.

I claim herein as my invention—

1. The combination of an inclosing-case, a pipe-section fitting freely therein, a packing ring or gasket closely surrounding the pipe-section and fitting against the inner surface of the end of the case, a collar or abutment fixed upon the pipe-section, and a spring bearing against said collar and against the packing-ring, substantially as set forth.

2. The combination of an inclosing-case, a pipe-section passing through an end opening therein, having a bore of sufficient diameter to allow variation of the position of the pipe-section relatively to the axial line of the case, a packing ring or gasket closely surrounding the pipe-section and fitting against the inner surface of the end of the case, and a spring bearing against said packing-ring and against a fixed abutment on the pipe-section, substantially as set forth.

3. The combination of an inclosing-case, a pipe-section passing through an end opening of greater diameter therein, a bearing-ring of circular or elliptical section fitting in the inner end of the opening in the case, a packing ring or gasket surrounding the pipe-section and fitting against said bearing-ring and against the inner surface of the end of the case, and a spring bearing against said packing-ring and against a fixed abutment on the pipe-section, substantially as set forth.

4. The combination of a sectional inclosing-case, two pipe-sections, each passing through an end opening in the case having a bore of sufficient diameter to allow variation of the position of the pipe relatively to the axial line of the case, a packing ring or gasket closely surrounding each pipe-section and fitting against the inner surface of the adjacent end of the case, and springs bearing against said packing-rings and against collars or abutments fixed upon the pipe-sections, the fixed collar of one pipe-section having an end recess surrounding the end of the other section and out of contact therewith, substantially as set forth.

In testimony whereof I have hereunto set my hand.

FREDERICK CROCKER.

Witnesses:
F. L. BARTLETT,
GEO. A. BORDEN.